United States Patent
Wang et al.

(10) Patent No.: US 8,005,313 B2
(45) Date of Patent: Aug. 23, 2011

(54) EDGE ENHANCING DEVICE AND METHOD

(75) Inventors: Chi-Feng Wang, Chung Ho (TW);
Chia-Wei Yu, Tai Pei (TW); Yen-Hsing Wu, Hsin Chu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 1021 days.

(21) Appl. No.: 11/896,755

(22) Filed: Sep. 5, 2007

(65) Prior Publication Data

US 2008/0056600 A1 Mar. 6, 2008

(30) Foreign Application Priority Data

Sep. 6, 2006 (TW) ................. 95132824 A

(51) Int. Cl.
*G06K 9/40* (2006.01)
*G06K 9/48* (2006.01)

(52) U.S. Cl. ......... 382/266; 382/199; 382/200; 382/263

(58) Field of Classification Search ........................ None
See application file for complete search history.

(56) References Cited

U.S. PATENT DOCUMENTS

| 4,985,764 A | 1/1991 | Sato et al. |
| 5,991,463 A | 11/1999 | Greggain et al. |
| 2006/0291741 A1 * | 12/2006 | Gomi et al. .................. 382/266 |
| 2007/0154097 A1 | 7/2007 | Wang et al. |

FOREIGN PATENT DOCUMENTS

TW 535408 6/2003

* cited by examiner

*Primary Examiner* — Anand Bhatnagar
*Assistant Examiner* — Randolph Chu
(74) *Attorney, Agent, or Firm* — Muncy, Geissler, Olds & Lowe, PLLC

(57) ABSTRACT

An edge enhancing apparatus includes: an edge detector, for determining an edge direction of an image region corresponding to a target pixel; and a pixel value determining module, coupled to the edge detector, for obtaining a plurality of pixel values of a plurality of pixels and an initial pixel value of the target pixel according to the edge direction, and performing a calculation on the plurality of pixel values and the initial pixel value to generate a calibrated pixel value.

14 Claims, 4 Drawing Sheets

EDGE ENHANCING DEVICE AND METHOD

BACKGROUND OF THE INVENTION

1. Field of the Invention

The present invention relates to an image processing device and related image processing method thereof, and more particularly, to an edge enhancing device and related edge enhancing method thereof.

2. Description of the Related Art

In the process of scaling an image, new scan lines of the scaled image are generated by interpolating original scan lines. Unfortunately, the above-mentioned interpolation may affect the edge of the image, and blur the edge of the image.

Therefore, when an image is being scaled, edge enhancement, or peaking, is performed to prevent the image from blurring. Traditionally, the edge enhancement is performed as follows: first, a high-pass filtering operation is performed on the image to obtain high-frequency information of the image, and then the high-frequency information is added back to the original image. After the above-mentioned operations, the high-frequency information is enhanced, and the edges are enhanced accordingly.

However, the above-mentioned edge enhancement is focused on all of the high-frequency information of the image, but is not able to distinguish the edges of the image from other high-frequency components. For example, in addition to the edges, noises may have high-frequency characteristics. Therefore, if the enhancement operation is performed on high-frequency information of the image, not only the edges are enhanced, the noises are also enhanced, which, obviously, reduces the display quality of the image.

SUMMARY OF THE INVENTION

In view of the above-mentioned problems, an object of the invention is to provide a more reliable and more precise edge enhancing device and related edge enhancing method thereof.

According to an embodiment of the present invention, an edge enhancing device is disclosed. The edge enhancing device comprises: an edge detector, for determining an edge direction of an image region corresponding to a target pixel; and a pixel value determining module, coupled to the edge detector, for obtain an original pixel value of the target pixel and a plurality of pixel values of a plurality of pixels according to the edge direction, and performing a calculation on the original pixel value and the plurality of pixel values to generate an adjusted pixel value.

According to another embodiment of the present invention, an edge enhancing method is disclosed. The edge enhancing method comprises: determining an edge direction of an image region corresponding to a target pixel; obtaining an original pixel value of the target pixel and a plurality of pixel values of a plurality of pixels according to the edge direction; and performing a calculation on the plurality of pixel values and the original pixel value to generate an adjusted pixel value.

The present invention performs the edge enhancement according to the edge direction of the image. Therefore, the present invention can prevent from enhancing the noises. In other words, the present invention can increase the edge effect of the image such that the display quality of the image can be improved.

DETAILED DESCRIPTION OF THE INVENTION

Figure 1:
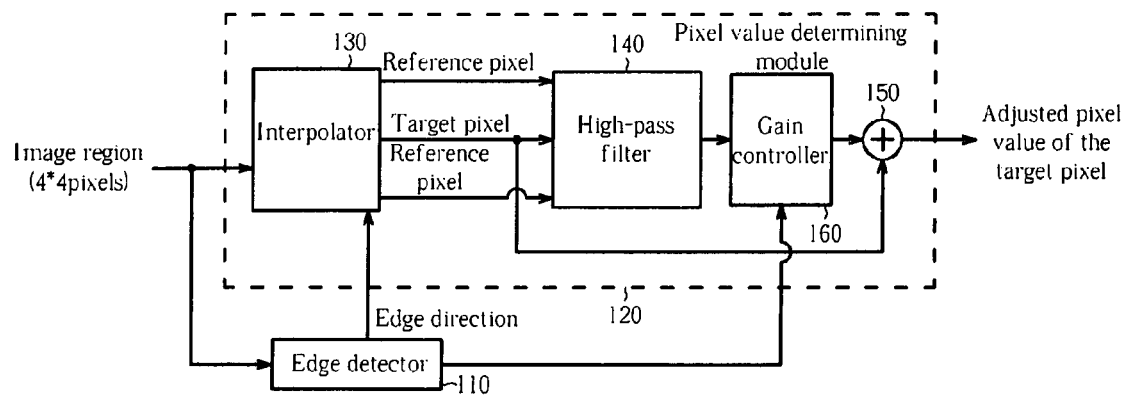
FIG. 1 is a diagram of a first embodiment of an edge enhancing device according to the present invention.

Please refer to FIG. 1, which is a diagram of a first embodiment of an edge enhancing device 100 according to the present invention. As shown in FIG. 1, the edge enhancing device 100 comprises an edge detector 110 and a pixel value determining module 120. The pixel value determining module 120 comprises an interpolator 130, a high-pass filter 140, an adder 150, and a gain controller 160. In this embodiment, the edge enhancing device 100 is used to cooperate with the operation of scaling an image. Therefore, in this embodiment, during interpolating a plurality of pixels surrounding the target pixel to generate the pixel value of the target pixel, the edge enhancing device 100 can detect whether an edge exists in the image region in the surrounding of the target pixel as well as the edge direction, and then enhance the edge according to the detecting result. However, the above-mentioned operation merely serves as an example, not a limitation. As is understood by those skilled in the art, the present invention edge enhancing device is not limited to the application of image scaling; in actual implementation, the present invention edge enhancing device/method can work with other image processing processes.

Figure 2:
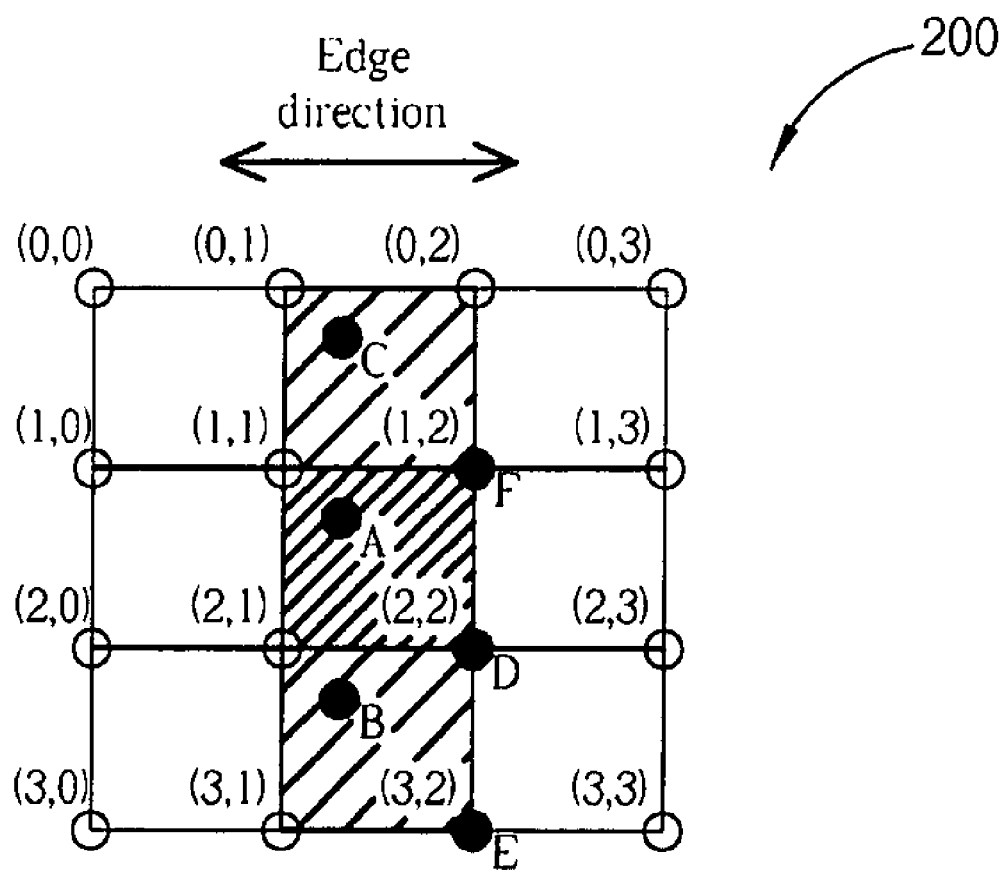
FIG. 2 is a diagram showing an image region obtained by the edge enhancing device shown in FIG. 1.

In the following disclosure, the operation and function of the edge enhancing device 100 are clearly illustrated. First, when the edge enhancing device 100 starts to process a target pixel, the edge enhancing device 100 first obtains image data of an image region corresponding to the target pixel. Please refer to FIG. 2, which is a diagram showing an image region 200 obtained by the edge enhancing device 100 shown in FIG. 1. As shown in FIG. 2, the edge enhancing device 100 obtains an image region 200 (4 pixels*4 pixels) corresponding to a target pixel (such as the point A shown in FIG. 2).

And then, the edge detector 110 detects an edge direction of the image region 200 according to the 4 pixels*4 pixels image region 200. Please note that, in this embodiment, the edge detector 110 can be implemented as an edge detector 110, which adopts a classification algorithm in detecting the edge direction. The operation and function of such an edge detector 110 has been disclosed in U.S. patent application Ser. No. 11/616,844, whose content is incorporated herein by reference, and thus detailed description is herein omitted. However, please note that, the edge detecting technique described in U.S. patent application Ser. No. 11/616,844 is only regarded as a preferred embodiment, but not a limitation of the present invention. Those skilled in the art can readily replace the edge detector 110 by other edge detectors equipped with other known or new edge detecting techniques after understanding the disclosure of the present application.

Figure 3:
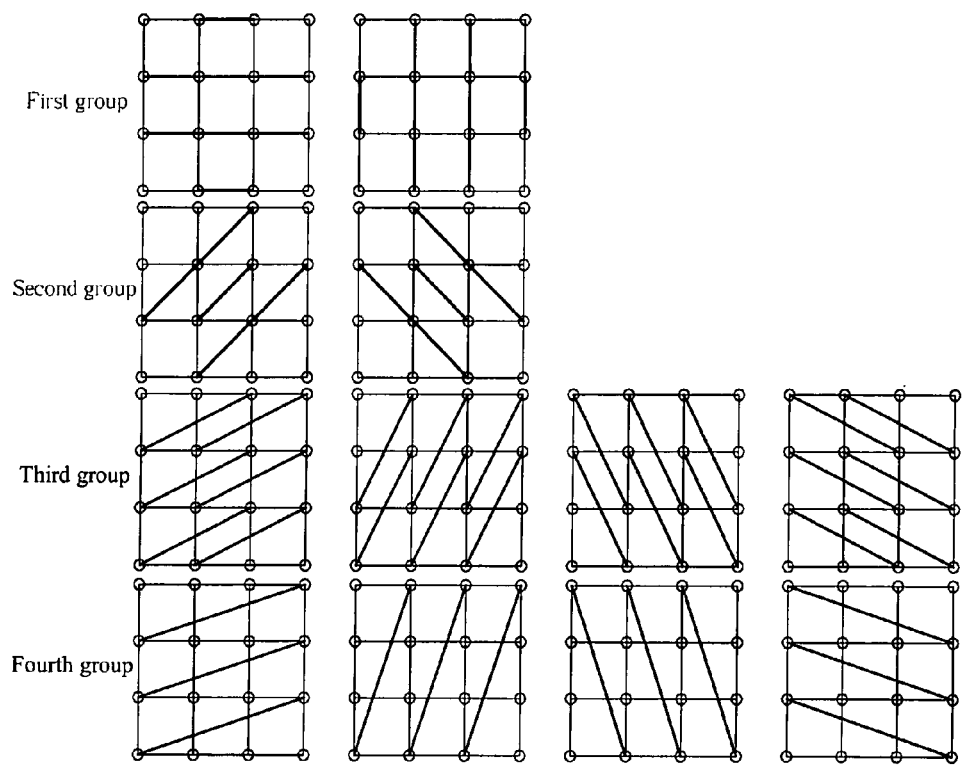
FIG. 3 illustrates the positions of reference pixels and a target pixel when the image region has a tilted edge direction.

According to U.S. patent application Ser. No. 11/616,844, the edge detector 110 detects whether there is an edge in the above-mentioned 4*4 pixels image region. It further teaches that if there is an edge, the edge detector 110 detects which one of the 12 edge directions shown in FIG. 3 is the edge direction of the detected edge of the image region. In FIG. 3, the first group comprises vertical and horizontal edges, the second group comprises edges having slopes 1 or −1(45 degrees), the third group comprises edges having slopes 2, ½, −2, or −½, and the fourth group comprises edges having slopes 3, ⅓, −3, or −⅓. After the edge detector 110 determines the edge direction of the image region 200, the information of the edge direction is transferred to the interpolator 130.

The interpolator 130 determines the weights, which are to be used in the interpolation, according to the position of the target pixel. And then, the interpolator 130 utilizes the weights to perform weighted average operations on a plurality of pixel values of the pixels surrounding the target pixel (such as pixels located on (1,1), (1,2), (2,1), (2,2)) such that the original pixel value of the target pixel A can be obtained. Please note that since the operation of the image interpolation is well known to those skilled in the art, more detailed illustrations are omitted herein.

However, in addition to the interpolation operation of the target pixel, in order to perform the edge enhancement, the interpolator 130 further performs the interpolation operations to generate reference pixel values of reference pixels, which are located on appropriate locations. For example, if the edge detector 110 determines that the edge direction of the image region 200 is horizontal (corresponding to 0 degree), the interpolator 130 further generates reference pixel values of two reference pixels (such as pixels B and C shown in FIG. 2). The way of generating the pixel values of the reference pixels B and C is similar to that of generating the pixel value of the target pixel A. For example, the interpolator 130 can utilize the above-mentioned weights to perform weighted average operation on pixels located on (2,1), (2,2), (3,1), (3,2) to obtain the pixel value of the reference pixel B, and utilize the same weights to perform weighted average operation on pixels located on (0,1), (0,2), (1,1), (1,2) to obtain the pixel value of the reference pixel C.

And then, the high-pass filter 140 performs a high-pass filtering operation on the above-mentioned three pixel values (including two reference pixel values of two reference pixels and the original pixel value of the target pixel) to generate high-frequency information of the target pixel. For example, the high-pass filter 140 can multiply the two reference pixel values by a smaller weight (such as −1), multiply the original pixel value of the target pixel by a larger weight (such as 2), and in such a manner perform weighted average operation that the above-mentioned high-frequency information can be generated. In other words, the high-frequency filter 140 performs the filtering operation with the weights (−1, 2, −1) on the aforementioned three pixel values.

Afterwards, the adder 150 adds the high-frequency information to the original pixel value of the target pixel such that an adjusted pixel value of the target pixel can be generated. This adjusted pixel value is used as an update of the original pixel value of the target pixel. In this way, the edge of the image can be enhanced. Moreover, the gain controller 160 is further utilized to adjust the gain of the high-frequency information to further enhance the display effect of the edge of the image. In this embodiment, the gain controller 160 can set the gain value corresponding to the high-frequency information according to the detection result of the edge detector 110 in order to obtain an optimized edge enhancement effect.

After the edge enhancing device 100 perform the edge enhancement operation on the target pixel, which means after the adjusted pixel value is generated, the edge enhancing device 100 starts to process a next target pixel. The above-mentioned operations are continuously performed until all pixels of the entire image are processed.

Please note that, if the detection result of the edge detector 110 shows that there is no apparent edge direction in the image region 200, the edge enhancing device 100 does not perform those following operations to avoid spoiling the image. At this time, the edge detector 110 can control the gain controller 160 to set the gain value of the high-frequency information as 0. In this way, the final output pixel value is equal to the original pixel value of the target pixel, which is originally calculated by the interpolator 130.

From the above disclosure, it can be seen that the present invention edge enhancement technique first utilizes an edge detection technique to determine the edge direction of the image, and then enhances the image according to the edge direction. Please note, for the entire image, the present invention does not perform the edge enhancement all the time. Instead, the present invention selectively performs the edge enhancement on individual image region, which depends on whether there is an apparent edge direction of the image region. In this way, the present invention can avoid enhancing the noises of the image.

Please note that, in the above embodiment, the three pixels (including the target pixel and two reference pixels) are chosen along the vertical direction of the edge direction. But this is only regarded as a preferred embodiment, not a limitation of the present invention. In actual implementation, the three pixels (including the target pixel and two reference pixels) only need to be chosen roughly, but not precisely, along the vertical direction of the edge direction, in order that the edge enhancement effect can be achieved.

Figure 4:
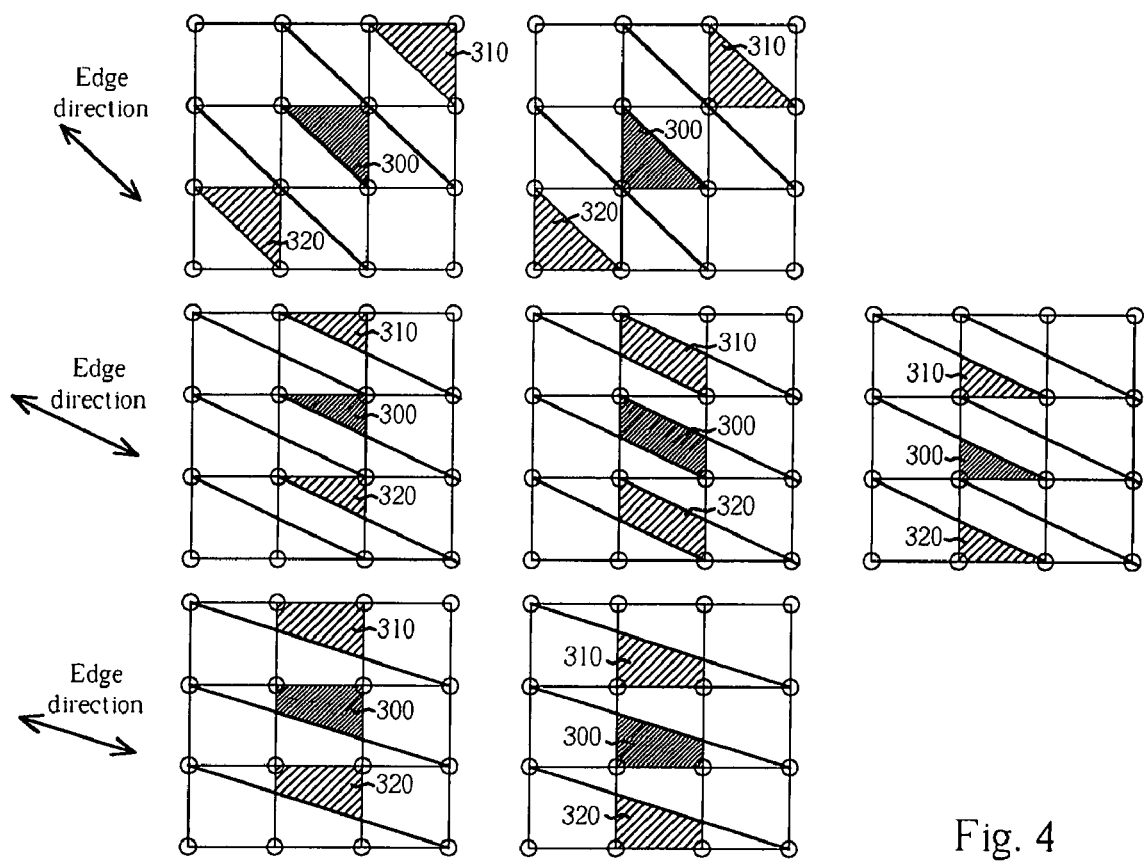
FIG. 4 is a diagram showing the positions of two reference pixels when the image region has a tilted edge direction according to the present invention.

Please refer to FIG. 4, which is a diagram showing the positions of two reference pixels when the image region has a tilted edge direction according to the present invention. FIG. 4 respectively shows an example of the second group, an example of the third group, and an example of the fourth group as shown in FIG. 3 (while an example of the first group has been shown in FIG. 2). In FIG. 4, the shadow region 300 having denser slope lines represents the region where the target pixel is located, and the shadow region 310 and 320 represent the regions where the reference pixels are located.

As mentioned previously, when the image region has tilted edge direction (such as the third group or the fourth group), the target pixel and the two reference pixels only need to be chosen roughly along the vertical direction of the edge direction. As shown in FIG. 4, when the target pixel is located in the shadow region 300, the present invention can obtain two reference pixels from the shadow regions 310 and 320 to perform the high-pass filtering operation. This can still achieve the purpose of edge enhancement, and conforms to the spirit of the present invention.

As mentioned previously, in a preferred embodiment, the target pixel and the reference pixels are located on the vertical direction of the edge direction such that an optimized edge enhancement effect can be achieved. When the edge direction corresponds to 0 or 90 degrees (such as the embodiment shown in FIG. 2), it is without difficulty to obtain the reference pixel values of the two reference pixels; however, when the edge direction does not correspond to 0 or 90 degrees (such as the embodiments shown in FIG. 4), strictly requiring the two reference pixels and the target pixel being located on the vertical direction of the edge direction actually increases the complexity of the image processing. As a result, in the above disclosure, the present invention utilizes the shadow regions 310 and 320 as a substitute strategy for obtaining the two reference pixels. Although, as shown in FIG. 4, it is still desirable that the shadow region 300, where the target pixel is located, and the shadow regions 310 and 320 roughly fall on the vertical direction of the edge direction, the present invention method of obtaining two reference pixels from the shadow regions 310 and 320 does not impose so harsh a restriction as requiring strict vertical direction line-up, and can still achieve the purpose of enhancing the image.

Therefore, the present invention does not impose further restriction on the shadow regions 310 and 320. Basically, it is only desirable that appropriate reference pixels can be obtained from within the shadow regions 310 and 320, such that the operation of high-pass filtering the obtained reference pixels and the target pixel can result in substantial edge enhancement effect. Therefore, the designer can determine a larger or smaller shadow regions 310 and 320 according design needs.

Furthermore, in the above-mentioned embodiment, the present invention edge enhancing device 100 is utilized in a scaler. Therefore, the edge enhancing device 100 comprises an interpolator 130 for scaling an image. However, the interpolator 130 can be regarded as a pixel value obtaining module for obtaining the reference pixel values of the two reference pixels and the original pixel value of the target pixel to perform the follow-up operations. In other words, in the case where the image is in no need of being scaled, for example, where the pixel value of the target pixel is not generated through interpolation, but is one of the 4*4 pixels in the image region, the interpolator 130 can directly utilize existing target pixel (such as the pixel located on the point (2,2)) and existing reference pixels (such as the pixels located on the points (1,2) and (3,2)) shown in FIG. 2) for calculation.

Please note that, the gain controller 160 is an optional component. As mentioned earlier, the gain controller 160 is utilized to further enhance the display effect of the edge. Therefore, the above-mentioned edge enhancing device 100 is regarded as a preferred embodiment of the present invention. In actual implementation, the present invention edge enhancing device 100 does not have to comprise the gain controller 160.

In addition, the present invention does not limit the size of the image region. In the above-mentioned embodiment, the present invention detects an edge direction of a 4*4 pixels image region and performs the edge enhancement according to the 4*4 pixels image region. However, the designer can adopt an image region of a different size according to design needs.

On the other hand, the present invention does not limit the parameters utilized by the high-pass filter 140. As mentioned earlier, the high-pass filter 140 multiplies the reference pixel values of the reference pixels with a smaller weight (such as −1), multiplies the original pixel values of the target pixel with a larger weight (such as 2), and as such performs the weighted average operation on the pixel value to generate the above-mentioned filtered pixel value. However, the designer can change the weights according to different design needs.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An edge enhancing device applying to an image processing device, comprising:
    an edge detector, disposed within the image processing device, for determining aft single edge direction of an image region corresponding to a target pixel, wherein the image region constitutes by a pre-determined number of pixels surrounding the target pixel; and
    a pixel value determining module, disposed within the image processing device, coupled to the edge detector, to obtain an original pixel value of the target pixel according to the position of the target pixel and a plurality of reference pixel values of a plurality of reference pixels for enhancing the edge according to the single edge direction, and performing a weighted average operation to multiply the original pixel value and the plurality of reference pixel values by different weights separately to generate a high-frequency information of the target pixel, and generate an adjusted pixel value of the target pixel according to the high-frequency information and the original pixel value;
    wherein the image processing device is used for executing image processing processes.

2. The edge enhancing device of claim 1, wherein the plurality of reference pixels and the target pixel correspond to a direction, and the direction and the edge direction are substantially orthogonal.

3. The edge enhancing device of claim 1, wherein the pixel determining module comprises:
    a high-pass filter, coupled to the edge detector, for performing a high-pass filtering operation on the plurality of pixels reference values of the plurality of reference pixels and the original pixel value of the target pixel to generate a filtered pixel value; and
    an arithmetic module, coupled to the high-pass filter, for generating the adjusted pixel value according to the filtered pixel value and the original pixel value;
    wherein the high-frequency information comprises the filtered pixel value.

4. The edge enhancing device of claim 3, wherein the arithmetic module comprises:
    an adder, for adding the filtered pixel value to the original pixel value to generate the adjusted pixel value.

5. The edge enhancing device of claim 1, wherein the pixel value determining module comprises:
    a gain controller, coupled to the edge detector, for adjusting a gain of the filtered pixel value according to the edge direction.

6. The edge enhancing device of claim 1, wherein the pixel value determining module comprises:
    an interpolator, for performing an interpolating operation on pixels of the image region to generate the original pixel value of the target pixel and the plurality of reference pixel values of the plurality of reference pixels.

7. The edge enhancing device of claim 6, being utilized in a scaler.

8. An edge enhancing method comprising: using a processor to perform:
    determining an edge direction of an image region corresponding to a target pixel, wherein the image region constitutes by a pre-determined number of pixels surrounding the target pixel;
    obtaining an original pixel value of the target pixel according to the position of the target pixel and a plurality of reference pixel values of a plurality of reference pixels for enhancing the edge according to the single edge direction; and
    performing a weighted average operation to multiply the plurality of reference pixel values and the original pixel value by different weights separately to generate a high-frequency information of the target pixel, and generate an adjusted pixel value of the target pixel according to the high-frequency information and the original pixel value.

9. The edge enhancing method of claim 8, wherein the plurality of reference pixels and the target pixels correspond to a direction, and the direction and the edge direction are substantially orthogonal.

10. The edge enhancing method of claim 8, wherein the step of performing the calculation on the plurality of reference pixel values and the original pixel value comprises:
   performing a high pass filtering operation on the original pixel value of the target pixel and the plurality of reference pixel values of the plurality of reference pixels to generate a filtered pixel value; and
   performing a calculation on the filtered pixel value and the original pixel value to generate an adjusted pixel value.

11. The edge enhancing method of claim 10, wherein the step of performing the calculation on the filtered pixel value and the original pixel value comprises:
   adding the filtered pixel value to the original pixel value to generate the adjusted pixel value.

12. The edge enhancing method of claim 8, further comprising:
   adjusting a gain of the filtered pixel value according to the edge direction.

13. The edge enhancing method of claim 8, further comprising:
   performing an interpolating operation on pixels of the image region to generate the plurality of pixel values of the plurality of pixels and the original pixel value of the target pixel.

14. The edge enhancing method of claim 13, being utilized in a scaler.

* * * * *